United States Patent

Wheeling

[15] 3,636,322

[45] Jan. 18, 1972

[54] OPTIMIZATION WITH FUNCTION GENERATORS

[72] Inventor: Robert F. Wheeling, Mullica Hill, N.J.

[73] Assignee: Mobil Oil Corporation

[22] Filed: Feb. 15, 1963

[21] Appl. No.: 258,791

[52] U.S. Cl. ....................235/150.1

[51] Int. Cl. ....................G05b 13/02

[58] Field of Search ....................235/150.1

[56] References Cited

UNITED STATES PATENTS 3,079,079 2/1963 Phister et al. ....................235/150.1

OTHER PUBLICATIONS

Post, " Data Control— The Digital Computer as a Control Element" Automatic Control Oct. 1958, pp. 48– 52.

Kalman et al. " The Role of Digital Computers in the Dynamic Optimization of Chemical Reactions" 1959 Proceedings of the Western Joint Computer pp. 107– 116, 107– 109.

Pajaraman "Theory of a Two-Parameter Adaptive Control System" "IRE Transactions on Automatic Control" July, 1962 pp. 20–26

*Primary Examiner*—Eugene G. Botz

*Attorney*—Oswald G. Hayes and Donald L. Dickerson

[57] ABSTRACT

Method and apparatus for optimizing a system which includes the selection from a plurality of function models of a fractional portion of such models as a test group. Thereafter, a member of the group having characteristics most nearly corresponding with a selected function characteristic is then optimized. The system is then sampled at a point in the region of the point corresponding with the optimum of the member selected from the test group.

5 Claims, 11 Drawing Figures

ROBERT F. WHEELING
INVENTOR

BY [signature]

ATTORNEY

ROBERT F. WHEELING

INVENTOR

BY [signature]

ATTORNEY

ROBERT F. WHEELING
INVENTOR

BY O. G. Hayes
ATTORNEY

OPTIMIZATION WITH FUNCTION GENERATORS

This invention relates to the identification and/or production of an optimum of a function or condition with a minimum number of recourses to sample the function or condition and, more particularly, to the successive selection of system models in the course of an approach to or search for an optimum value of a function or condition.

Repeatedly encountered is the problem of determining or identifying an optimum condition or an optimum state in a system wherein several variables are involved. Where the number of variables involved is small, there are often readily applicable methods for determining or identifying an optimum condition or state. However, where there are a great number of variables or a great number of possible conditions within the system, the problem becomes far more complex and, in the past, has often been attacked purely from the standpoint of trial and error. In a paper published by the applicant under the title, "Optimizers: Their Structure," Communications of the A.C.M., Dec. 1960, page 632 et seq., it is pointed out that there is a distinct advantage to be obtained in the use of models for representing a system. Substantial simplification can be achieved by carrying out optimizing procedures on the model. The above paper points out the dual relationship between optimizers and models and suggests a specific organization or scheme to exploit this dual relationship.

The present invention relates to an operation of the general class disclosed in the aforementioned article and, more specifically, to the method in which a model is repeatedly selected with an optimizing step or steps taken following selection of each model. Subsequently, recourse is had on a minimal basis to the system for comparison of the optimized model with the system and in which the selection of the basic character of the model is at least in part random in nature.

It is an object of the present invention to provide an improved method of seeking an optimum point of a function or condition.

It is a further object of the invention to provide for a new and improved method of search in a system model for a system optimum.

More particularly, in accordance with the present invention there is provided a method of optimizing a system which includes the selection from a plurality of function models of a fractional portion of such models as a test group. Thereafter, a member of the group having characteristics most nearly corresponding with a selected function characteristic is then optimized. The system is then sampled at a point in the region of the point corresponding with the optimum of the member selected from the test group.

In a further aspect of the invention, there is provided for selection of a model from a multiplicity of models in accordance with a random selection. Preferably, random selection is employed for a test group following which the members of the test group are compared for the selection of one member from the test group following which the selected member is optimized before recourse is had to the system for further data.

For a more complete understanding of the present invention and for further objects and advantages thereof, reference may now be had to the following description taken in conjunction with the accompanying drawings in which.

Figures 1, 6:
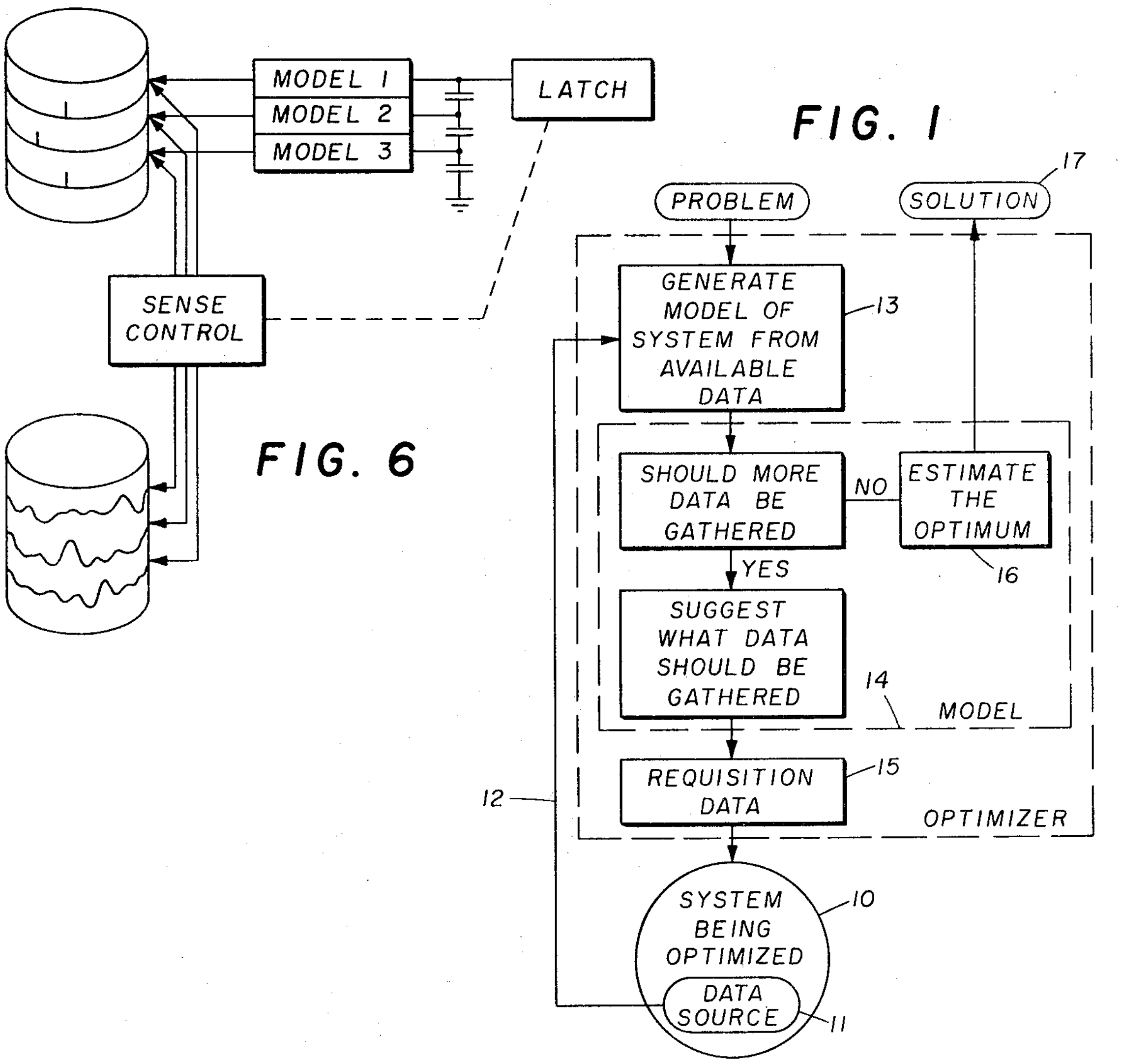
FIG. 1 is a block diagram illustrating an optimization system employing a model.
FIG. 6 illustrates a multidimensional system.

FIG. 1 illustrates a generalized configuration of an optimizer in which the generation and utilization of a model plays a significant part. The system being optimized is identified by the reference character 10 and provides a data source 11 which is coupled by way of a linkage 12 into a model generating and selecting system 13. The generation of a model is based upon data from the data source 11. Once the model is generated or selected, an optimizing operation then proceeds upon the model itself without recourse initially to the system being optimized. After optimization procedures are carried out on the model, then recourse is had to the model specifically to determine whether or not more data is needed and, if so, to suggest what data should next be gathered. The model 14 may include provision for both of the latter operations. There then is provided a linkage including the unit 15 to provide the requisition of data from the system being optimized. If, in the model, it is determined that more data is not required, then there is provided a means by way of the unit 16 whereby the optimum as represented by the model can be determined and provide a solution as indicated by block 17. The present invention deals primarily with the operations involved in generating or selecting the model 13 and the operations of optimizing on the model 14 rather than on the system 10.

More particularly, it has been found that the problems of carrying on optimization procedures on the system itself often are costly, time consuming and difficult to handle. On the other hand, where a model is selected and employed, optimization procedures can be carried out on the model with much greater facility and at considerably less expense than on many systems. However, in order to realize a substantial benefit from the concept suggested in FIG. 1, it has been found most helpful to resort to a unique mode of operation. Specifically, it has been found that substantial saving in time, effort and money can be effected if there is provided, in the steps indicated by the blocks 13 and 14 of FIG. 1, two or more (preferably a great many) models from which to choose, and then to provide for successive selection of models in a manner which, at least in part, is random.

It will be recognized that the system illustrated in FIG. 1 is generalized and suggests the application of the principles involved to complex systems in which there may be involved a great many variables and in which the problem of requisitioning data as through the step indicated by block 15 would be extremely costly and time consuming. Such data requisitioning should be undertaken only a minimum number of times in ascertaining an optimum condition for a given system. For example, in the operations involving selecting an optimum operating condition in a complex chemical processing unit such as a refinery for liquid hydrocarbons, there are many variables that can be adjusted in order to produce an optimum yield as received from some selected criteria. For example, in FIG. 2, a refinery unit A is illustrated in block form having subprocessing units therein such as the units B, C and D. The refinery unit A and each of the subunits B, C and D, involve many variables which must be controlled to optimize the products in the lines 1, 2 and 3. Such variables include the feed stock in the input line leading to the unit; temperature; pressure; type, quantity and other characteristics of the catalysts used; the manner in which the various streams are divided as among the subunits B, C and D; and the character and quantity of additives introduced into the system. All will play a determining part upon the optimum operation of the system. Where there are so many variables, it is difficult to make certain that all of them are optimum. However, under any one set of values for the parameters involved, a data point may be employed upon which the model 14, FIG. 1, may be generated.

Figure 2:
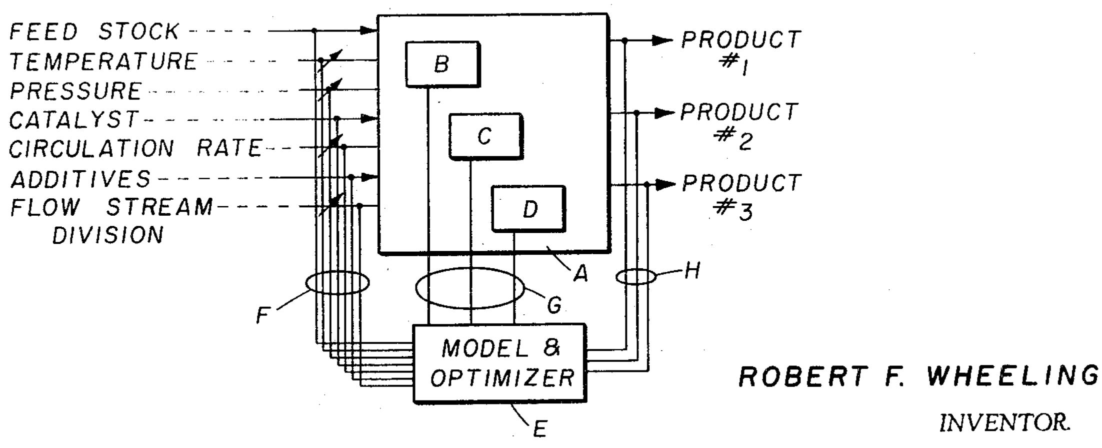
FIG. 2 is a generalized representation of a system shown in block form.

The present invention contemplates use of analog units as well as a digital computer programmed for generation by the computer of its own models of the system. Such models are embodied in the particular configurations of the computer under a given set of control conditions. Often such models are most readily described or expressed in mathematical form but in each case a physical embodiment thereof is readily formed. Such models may simulate the process in a portion of a refinery or even an entire refinery. Such models are, in the present invention, used to guide the optimizer in its search for an optimum for the system particularly where data gathering or sampling from the system being optimized consumes far more actual time than the generation or selection of a model within the computer. As an example of the magnitude of the problem, as to each of the parameters in a refinery unit such as represented by FIG. 2, it would be necessary to spend much time and labor in order for all changes to be made and an equilibrium condition reached under the new conditions so that the character of the output products could be reliably evaluated. In contrast, when using a model, the parameters on the system may be changed with much greater facility and without the necessity for the time- and labor-consuming operations involved in an actual refinery operation. Therefore, by using the acquired data, as at a given operating point in a refinery, to construct a model based upon the known reactions to the various parameters, a greater level of efficiency is attained and fewer recourses to the system for new data are required.

The optimizer may accumulate new data by periodically presenting a new set of proposed operating conditions for the system. However, before the optimizer can continue it must be given in return data that indicates the performance or the yield of the system for the conditions upon which the operating model has been formed. Such data may be determined by experiment with the system being optimized or, more often, by numerical calculation using a computer simulation of the system. The data thus employed permits the optimizer to generate models of the system without further outside assistance.

In accordance with one aspect of the present invention, model generation is accomplished through a random selection of a specific set of functions or models from a multiplicity of available models. A local model is chosen upon which an optimizing procedure is followed, following which the model may be replaced when recourse is next had to the system being optimized in order to secure a new data point as suggested by the model. Systems of the type involving digital computers are so constructed that they may devise and use their own models in their search for an optimum of the system being optimized. The system can select and test various kinds of models, the generation and utilization thereof, and provide for far more efficient optimization procedures than prior art systems.

Figure 3:
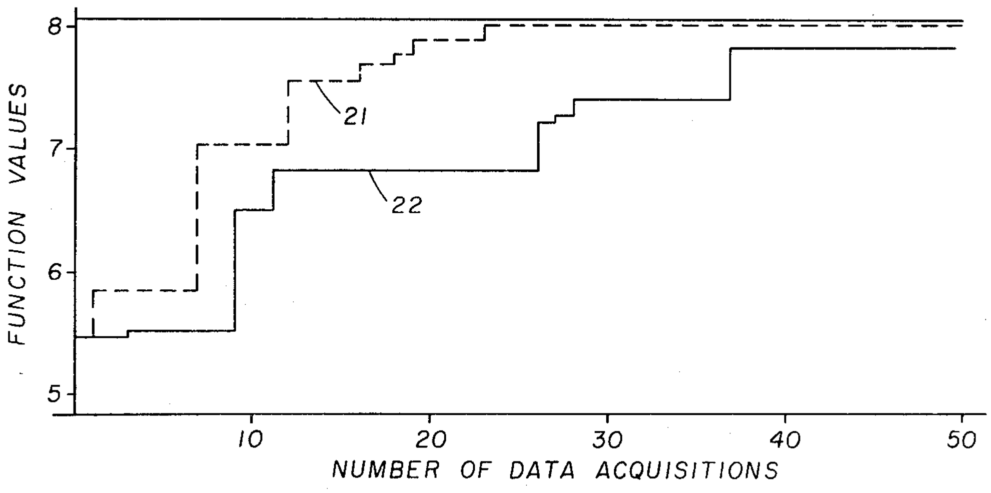
FIG. 3 illustrates an improvement in optimization methods of the present invention over prior art methods.

FIG. 3 indicates merit in operation wherein model selection is in part random and is followed by optimization performed upon the model itself before recourse is had to the system being optimized. One of the two curves shows the results of prior art optimizers. The other shows results of optimization in accordance with the present invention. The curve 22 indicates that the closest approach to a function maximum was achieved only after about 37 acquisitions of new data from the system being optimized. In accordance with the present invention wherein a particular selection of a model was employed, it was found that achieving this same degree of optimization occurred on the order of about 18 acquisitions of data from the system being optimized. In further tests on the system not only was such model selection employed, but also constraints were applied. In the latter case the optimizer required less than one-fortieth of the data acquisitions in order to achieve the same degree of approach to function maximum as prior art systems.

Figure 4:
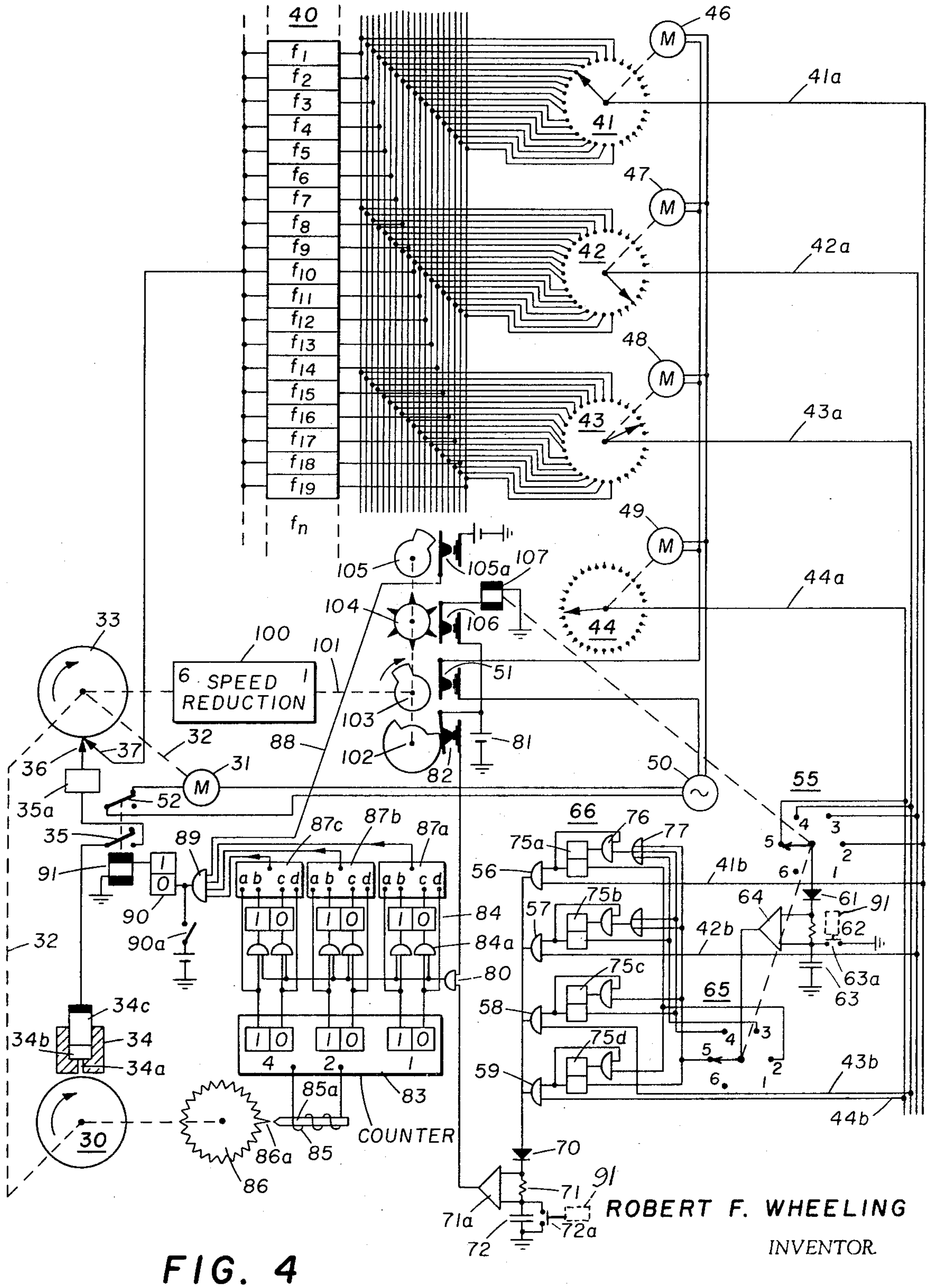
FIG. 4 illustrates one system for carrying out the present invention.

FIG. 4 illustrates a system of the analog type embodying the present invention. This system is limited to a one-dimensional problem, the character of which may best be understood by referring to FIG. 5A. In FIG. 5A there is plotted a function ($f$) which is a single-valued function of the variable $x$ where the data is a continuous function having values to which reference will be made at each of the abscissae $x_1$–$x_n$. The problem is to locate the abscissa where the maximum ordinate $a_{max}$ occurs. In a one-dimensional system this generally is a fairly simple problem but not always so, as will be shown. This simple problem is employed in the present case to illustrate the invention. The extension of the problem into multiple dimensions, as will later be described, will further demonstrate utility of the invention.

Referring now to FIG. 4, a drum 30 forms a part of a scanning system in which a scanning head 34 is employed to reproduce or to generate a function representative of a distribution of given character around the periphery of the drum. While the drum may be, perhaps, best understood if it were to be of the type commonly known in magnetic storing operations, for the purpose of the present invention the drum can provide storage in a detectable manner of any distribution function. It will be assumed that the distribution function is of the character represented by the curve of FIG. 5A. Further, it will be assumed that the function of FIG. 5A is such that detection thereof requires a substantial period of time to read any one point. More particularly, the distribution function on drum 30 is a radioactive tracer strip such as a sample of the distribution across a flow channel. Radioactivity from the drum is of very low intensity. In order to establish any one point on the curve of FIG. 5A, it is necessary for the drum 30 to remain stationary for substantial periods of time while radiation passes through a collimation slit 34$a$ to impinge a radiation detector such as a crystal 34$b$, whose output in turn is detected by a photomultiplier tube 34$c$. Where the distribution function on the drum is of this character, it will be of utility to construct a model of the distribution function and then optimize or search out the maximum point on the distribution function through use of the model so that the long measuring periods as between the drum 30 and detector 34 will be required but a minimum number of times. Drum 30 is driven by motor 31 as indicated by the linkage 32. The linkage 32 also extends to a second or model storage drum 33 so that drums 30 and 33 are driven synchronously. The detector head 34 is connected to a recording head 36 on drum 33 so that there may be produced on a channel including switch 35 a signal from the function on drum 30. The channel including switch 35 includes a counter 35$a$ which energizes the record head 36. A playback head 37 is also provided for playing back or detecting any signals stored on drum 33. The playback head 37 is connected by way of a conductor 38 to a bank of filters or function generators 40.

Each of the filters, $f_1$, $f_2$–$f_n$, in the bank 40 has its output connected to one terminal on each of a plurality of multiterminal selector switches. Four such switches, the switches 41, 42, 43 and 44, are shown. The armatures of the switches 41–44 are independently driven. Motor 46 drives the armature of switch 41. Motors 47, 48 and 49 drive the armatures of switches 42–44, respectively.

The motors 46–49 are energized from a source 50 by way of a circuit including a cam operated switch 51. The motor 31 also is energized from the source 50 by way of the relay operated switch 52.

The armatures of switches 41–44 are connected to terminals 1–4 of a six-terminal stepping switch 55. Additionally, the armature of switch 41 is connected to one input of an AND-gate 56. The armature of switch 42 is connected to one input of an AND-gate 57. Similarly, the armatures of switches 43 and 44 are connected to one input of AND-gates 58 and 59, respectively.

The armature of the stepping relay 55 is connected to ground by way of a diode 61, a resistor 62 and a condenser 63. An amplifier 64 having its input terminal connected across resistor 62 is connected at its output to the armature of a six-terminal stepping relay 65. Circuits from the first four terminals of the stepping relay 65 lead to a latching system 66. The latching system 66 serves to select one of the channels including the AND-gates 56–59 through which signals will be transmitted to a sensing system including diode 70, resistor 71 and condenser 72. The latching network 66 serves to selectively energize one, and only one, of the AND-gates 56–59 during a filter selection operation. Thereafter a selected signal will be played through the selected filter for further operations as will be described.

The second input of the AND-gate 56 is to be energized from a bistable multivibrator 75 one input of which is energized from the terminal No. 1 of switch 65. The other input, or the reset input, of the multivibrator 75 is controlled by an AND-gate 76 one terminal of which is controlled by the output of the multivibrator and the second terminal of which is controlled by an OR-gate 77. The OR-gate 77 is energized from all of terminals 2, 3 and 4 of switch 65.

The second terminal of the AND-gate 57 is controlled in the manner above described for the AND-gate 56 except that the multivibrator 75*a* is fed from terminal No. 2 of switch 65 and the OR gate is fed from only terminals Nos. 3 and 4. Similarly, the multivibrator 75*b* is energized from terminal No. 3 of the switch 65 and the AND gate ahead of the multivibrator is fed only from terminal No. 4 of switch 65. The AND-gate 59, on the other hand, is controlled by a multivibrator one terminal of which is energized from terminal No. 4 of switch 65 and the other terminal of which is controlled by the output of the multivibrator and the signal on terminal No. 1 on switch 65.

Any signal developed across the resistor 71 is applied to one terminal of an AND-gate 80. The second terminal of the AND-gate 80 is controlled by a potential from a battery 81 which is applied by way of a cam-driven switch 82. When the AND-gate 80 is energized, it serves to transfer or switch any data in a counter 83 to a storage register 84. Counter 83 is repetitively cycled from a pulse generator 85. The pulse generator 85 includes a timing wheel 86 which is driven in synchronism with drums 30 and 33 and includes a plurality of teeth around the periphery thereof one of which, the tooth 86*a*, is a rest pulse generating tooth. A magnetic core 85*a* is provided with a coil the terminals of which are connected to the counter 83. Thus, the counter 83 will cyclically register counts representative of the abscissa of the function of the FIG. 5A. The counter 83 is connected to a storage register 84 by way of a shift register 84*a*. In the limited form illustrated, the storage register 84 includes provision for storing each of the digits 1, 2 and 4. Additional registers may be provided for extending this range. Both outputs of each of the storage units in the counter 83 are connected to switch and mix (AND-OR) units 87*a*, 87*b* and 87*c*. The outputs of units 87*a*–87*c*, as well as the control signal on line 88, are applied to the inputs of an AND-gate 89. Only upon coincidence between the count in the shift register 84 and the count on the counter 83 during the cycle when switch 82 is closed will the AND-gate 89 be energized. When AND-gate 89 is energized, a monostable multivibrator 90 is then energized to energize simultaneously to close switches 35, 63*a* and 72*a* and to open switch 52. Closure of switch 35 completes the circuit from the photomultiplier tube 34*c* to the counter 35*a* so that the counter will accumulate a count and apply a signal proportional thereto to the recording head 36. Opening of switch 52 stops the drums 30 and 33 at a rotational position corresponding with the instant of cessation of any signal voltage developed across resistor 71 during the preceding cycle. Closure of switches 63*a* and 72*a* discharges condensers 63 and 72 preparatory to the next cycle.

Further to complete the control aspects of the system illustrated in FIG. 4, there is provided a speed reduction unit 100 which provides a 6-to-1 speed reduction so that the linkage 101 which drives three cams 102, 103 and 104 causes the cams to rotate one complete revolution for every 6 revolutions of the drums 30 and 33. The first cam 102 serves to maintain switch 82 closed for the duration of the second to the fifth revolution of the drums 30 and 33. The second cam 103 serves to maintain the switch 51 closed for an initial revolution of drums 30 and 33, thus applying power from source 50 to motors 46–49. The third cam 104 serves periodically to close switch 106 thereby to energize a relay coil 107. The coil 107 actuates the stepping relays 55 and 56, moving the armatures thereof from one output terminal to another at the end of each complete revolution of drums 30 and 33. The fourth cam 105 maintains switch 105*a* closed for the duration of the sixth cycle.

Now that the structure of the system illustrated in FIG. 4 has been described, the manner in which this system functions to carry out the present invention will be set forth. Assume that the distribution function on drum 30 initially is completely unknown. The relay 91 is energized to close switch 35 and open switch 52 as by manual closure of switch 90*a*. Multivibrator 90 is monostable and has an astable period as to maintain the switch 35 closed and switch 52 open for a predetermined interval of time. The time interval as controlled by the multivibrator 90 will be adjusted to be adequate to permit accumulation of a count accurately representative of the value of the distribution function of FIG. 5A at the point at which the aperture 34*a* is located. The count accumulated by the counter 35*a* is then registered as a scalar quantity or a single pulse on the drum 33. Upon release of the relay 91 the switch 35 is opened and the switch 52 is closed. This serves to energize motor 31 and rotate the drum 33, drum 30 and the timing wheel 86.

During the first revolution, the switch 51 is closed by cam 103. In this condition the source 50 energizes motors 46–49. Motors 46–49 are high-speed motors compared with motor 31 so that the armatures of switches 41–44 are driven through a number of cycles. Motors 46–49 are completely dephased and are random in their movement one relative to the other. At the end of the first revolution of drum 33, switch 51 is opened. This deenergizes motors 46–49 leaving switches 41–44 connected to a particular set of the filters in bank 40.

During succeeding second revolutions of the drums 30 and 33, the set of filters selected during the first revolution are compared. More particularly, during the second revolution a signal representative of the impulse response of the first in the set of filters is applied by way of channel 41*a* to the diode 61, resistor 62 to charge condenser 63. So long as current flows through resistor 62, a signal voltage is applied to amplifier and shaper 64 to latch the bistable multivibrator 75 in an "On" position.

At the end of the second revolution, the switch 106 is closed by cam 104 to step the relays 55 and 56 to terminals No. 2. The impulse response of the second filter in the set of filters as connected through switch 42 to the conductor 42*a* is then applied by way of amplifier-shaper 64 to the second bistable multivibrator 75*a* leading to the AND-gate 57. In the form of the system herein shown, the multivibrator 75*a* will be actuated only if the signal on channel 42*a* exceeds in amplitude the signal applied by way of channel 41*a*. This is for the reason that the signal is effectively integrated and a charge is stored on condenser 63 so that only if the succeeding signal is of greater amplitude will any current flow through the resistor 62. Preferably the amplifier 64 is a high-gain clipping amplifier or a saturable amplifier which will produce a square wave pulse output so long as any current is flowing in the resistor 62.

If the signal on channel 42*a* exceeds the signal that was on channel 41*a*, then the second multivibrator will be latched on. At the same time, by reason of the connection from terminal No. 2 of switch 65 to the AND-gate 77, multivibrator 75 will be reset.

Similarly generated signals on channels 43*a* subsequently are sensed through the operation of the switch 106 and stepping relays 55 and 56. Thus, at the end of the fourth cycle of drums 30 and 33, one of the multivibrators 75*a*, 75*b* or 75*c* will be latched on, and one of the AND-gates 56–58 will be armed.

During the fifth cycle the switch 82 is closed by cam 102. It is maintained closed throughout the entire fifth cycle. During the fifth cycle the output of amplifier 64 is connected by way of switch 65 to multivibrator 75*d*. If, during the fifth cycle, any current flows through the resistor 62, the multivibrator 75*d* will be actuated thereby connecting the filter line 44*b* to the AND-gate 59 to the circuit including rectifier 70, resistor 71 and condenser 72. During the fifth cycle the shift register 84*a* will be actuated by the output of AND-gate 80 so long as the voltage on condenser 72 is increasing. The shift register will be deenergized at a point in time corresponding with the occurrence of the maximum amplitude signal transmitted to switch 55. Thus, there will be stored in the storage register 84 a condition representative of the time occurrence in the waveform of the maximum amplitude signal as sensed by one of the filters selected through switches 41–44.

The selected filter is the one whose response is the most desirable as determined by the logic in the latching system. Thus, during the fifth cycle the latching system 66 is fixed or conditioned. As a result, there is stored in register 84 indicia of the location within the cycle of the point of maximum amplitude.

During the sixth cycle this condition is read out to energize the AND-gate 89 at the instant represented by the stored condition. AND-gate 89 is armed during the sixth cycle by closure of switch 105*a* by cam 105.

More particularly, any voltage developed across resistor 71 is applied by way of a saturable amplifier 71*a* to one input of the AND-gate 80. The second input of the AND-gate 80 is armed by the closure of switch 82. So long as there is any transmission through the AND-gate 80, the count accumulating during the fifth cycle of the drums 30 and 33 will be transmitted to the storage register 84.

Termination of transmission through AND-gate 80 promptly stops the motor 31 as switch 52 is opened. At the same time the switch 35 is closed. At the same time switches 63*a* and 72*a* are closed to discharge condensers 63 and 72, respectively. Switches 63*a* and 72*a* are linked to relay coil 91, the linkages not being shown in FIG. 4.

Next follows a sampling interval wherein drums 30 and 33 are stationary and a new signal is impressed on drum 33. At the end of the sampling interval controlled by the period of multivibrator 90, the second pulse will be located on the drum 33 at a rotational position corresponding with the maximum amplitude in the impulse response of the filter selected during the first routine by switches 41–43 and the latching system 66.

As the monostable multivibrator 90 is automatically reset at the end of its astable period, the relay switches 35, 63*a* and 72*a* are opened and switch 52 is closed. A second routine of filter selection and readout is then initiated.

Figure 5:
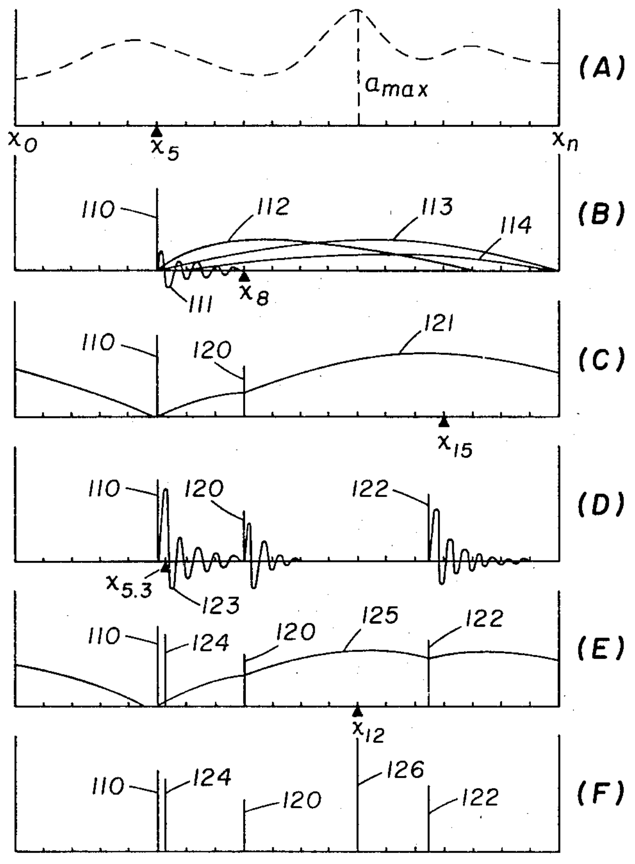
FIG. 5 (A–F) is a series of charts showing optimization steps employed on a model in the system of FIG. 4.

The sequence of operations in the system of FIG. 4 is illustrated by the graphs shown in FIG. 5. In FIG. 5A the distribution function is illustrated. The object is to determine the location along the abscissa of the occurrence of the function maximum. Assume that the initial closure of the switch 90*a* occurs at the instant corresponding with $x_5$. During the interval that the drums 30 and 33 are stationary, the pulse 110 is stored on drum 33. Assume that during the first cycle of drum 33 filters having impulse responses corresponding with the waveforms 111, 112, 113 and 114 are selected by motors 46–49. During the second, third, fourth and fifth cycles of the drum 33, signals corresponding with waveforms 111–114 are applied to the latching system. The latching system 66 selects the filter having the response 112 of FIG. 5B because it is of maximum amplitude. During the fifth cycle of drum 33, a signal corresponding with curve 112 is effective to control the count accumulated by counter 83. During the sixth cycle when the count on counter 83 equals the count in register 84, the multivibrator 90 is energized. In FIG. 5 this instant corresponds with $x_8$, the point of maximum amplitude on curve 112. As a result, the drums 30 and 33 are arrested during the sixth cycle at a time corresponding with the abscissa $x_8$. While stationary a count is again accumulated on counter 35*a* and a second pulse 120 is stored on the drum 33.

Assume that during the second routine a filter is selected having a response to the impulses 110 and 120 as represented by the curve 121. During the sixth cycle of the second routine, the multivibrator 90 will be actuated at the instant corresponding with $x_{15}$. During the interval that the drum is thus stopped, a third pulse 122 will be stored on drum 33.

Assume that the response to pulses 110, 120 and 122 of the filter next selected is represented by the curve 123. The drum 30 will be stopped during the sixth cycle of the third routine at a point corresponding with $x_{5.5}$. A pulse 124 will then be stored on the drum 33. If, during the fourth routine, the selected filter response is represented by the curve 125, then the drum will be stopped at $_{12}$. The pulse 126 then recorded on the drum 30 actually coincides with the value $a_{max}$ of FIG. 5A. Subsequent routines will not yield any pulse of magnitude greater than pulse 126 so that the search operation can be terminated after a reasonable number of cycles of operation all of which yield an output condition of magnitude less than that of pulse 126.

The search for optimum may be terminated when the condition stored in counter 83 in shift register 84 at the end of each routine remains unchanged from preceding routines. Termination may be accomplished manually after observing a constant value on register 84 or by a storage and readout system of the type involving additional shift registers, one for each of a plurality of routines and a like number of AND-OR gates such as the gate 87*a*. Actuation of a master control by such a sensing system may terminate the entire search operation.

From the foregoing it will be seen that the method involved in the operations depicted by FIG. 5 and carried out by the system of FIG. 4 includes the initial selection of a test set of model units. In the analog of FIG. 4, the model units include selected ones of the filters in bank 40. The units randomly selected are substantially smaller in number than the number of units available. In a digital system, the model units and random selection are programmed in the computer where the number from which selection can be made is generally greater than normally might be justifiable or permissible in an analog system. The capacity and flexibility of a digital computer in general will dictate use thereof in preference to an analog system. However, each and every step and each component disclosed in the analog of FIG. 4 has its structural and functional counterpart in the digital system. Therefore, for each model test set selected, a uniform and methodical comparison is made as between the members of the test set to determine, on the basis of a given criteria, the most desirable member of the test set for optimization operations. Thereafter, the location of the optimum value of the model selected is registered as on counter 83 and is employed to set the point at which the distribution function on the drum 30 is again scanned.

The filters in bank 40 or digital counterparts thereof may be of different families of filters and of types generally well known. For example, analog filters in bank 40 may include low-frequency filters, high-frequency filters, M- and K-type filters such as described in Communication Engineering by Everett, McGraw-Hill (1937), in the chapter entitled "Filters," page 179 et seq., and of the type further discussed in Industrial Electronics Handbook by Cockrell, McGraw-Hill (1958) in the section entitled "Filters" at page 1–276 et seq. The filters of the bank 40 may be single section filters or they may be multisection units of various combinations of filters. In any case, there is available to the system a great number of filters having different responses.

The selection of a subset or test set of filters in the embodiment illustrated in FIG. 4 is in part random by reason of the operation of the motors 46–49. It has been found that such a selection from a multiplicity of possible model units provides acceleration in the approach to an optimum of a given system. For the purpose of the search illustrated by the system of FIG. 4, the selection of a given model has been based upon the maximum amplitude of the positive going portion of the filter response. It will be appreciated that different criteria may be employed. For example, the rectifier 61 of FIG. 4 may be replaced by a full wave rectifier. Alternatively, the criteria may be a minimum number of zero axis crossings per unit time in which case a response such as the response 111 of FIG. 5B would be selected over any of the other responses of 112–114. A system for providing such discrimination may be of the type employed to sense the number of zero crossings per unit time in U.S. Pat. No. 2,956,635 to Summers. Such a sensing system for selecting the given model is based essentially upon the criteria of maximum smoothness or minimum smoothness, depending upon the manner in which the latching system responds to the measurement of frequency.

The foregoing are mentioned to indicate that the specific system illustrated in FIG. 4 is not in any sense limiting but is presented by way of example. Further, as above noted, if a computer of broader capabilities than the analog system shown in FIG. 4 is employed, the number of models available can be far greater than ordinarily would be employed in an analog system. For example, the models formed in a digital computer may be myriad in number though limited to a given class of mathematical models. For example, they might be models of the cubic form. Other families of models such as polynomial, trigonometric or exponential models are readily generated by a computer. Members from the family of models thus available are selected to form a test set from which one of the test set will be selected by systematic scanning thereof. Advantage accrues in the present method when there is available a considerable number of models from which a test set will be selected. Following selection of the test set, an examination is made as between the members of the set to select the one most nearly conforming to the system being modeled as determined by given criteria such as maximum amplitude (FIG. 4) or smoothness or the like. The models may be made available in only one of the foregoing mathematical families or they may include various combinations of members of the family or several families. In any case, there is produced a model representative of the system as far as the known data permits it to be based thereon. The model is then sampled at data points. The deviation as between the model and the system as represented by a distribution function is then determined. Following this new models are repeatedly selected and the operations repeated in order to arrive at the optimum of the function being optimized. Each model may provide at least one new data point for comparison with the function being optimized.

With reference to FIG. 6 it will be readily seen that the invention may be applied to a three-dimensional system. For example, three functions recorded on a multitrace magnetic drum may be employed much the same as the system of FIG. 4. The selection of a given model would include three filters, one from each of three separate banks. Three capacitors such as the capacitors 63 connected in series would store voltage so that the maximum contribution from the sum of the three filter outputs would provide a latching relationship as between the filter selected and the readout operation.

In FIG. 2 the application of the present invention to the refinery unit A having subprocessing units B, C and D is illustrated in the generalized form. The model and optimizer E may in a digital computer have input information applied thereto by way of channels F representing each of the input and control variables. Channels G represent input of data from the subprocessing units B, C and D. Channels H represent input of data from the output product lines 1, 2 and 3. The number of input variables may be great in this case, but the principle illustrated in FIG. 4 may be carried out in every detail in the system of FIG. 2. Thus, applicant has illustrated the manner in which the invention can be carried out in the analog sense. Each and every step of the analog method may be carried out by those skilled in the art in the digital environment. Further, the method thus carried out provides a unique, new and most useful advance in the art of optimizing. Applicant's preferred embodiment of the invention where a number of variables are involved involves use of the more flexible computer of the digital character. However, where a minimum number of variables are present, an analog system may be found to be equally satisfactory.

The analog system shown in FIG. 4 has been employed to illustrate a preferred mode of carrying out the method of the present invention. In this analog system certain components have been shown in block form. In general, both construction and operation of such units are well known. For example, the OR gates, such as gate 77, may be of the type disclosed as a "mix circuit" found at page II–11 of IBM 650 Data Processing System Customer Engineering Manual of Instruction, International Business Machines Corp., New York, 1956.

The AND gates, such as gates 76, 80 and 89, may be of the type disclosed as a "switch" at page II–11 of the above-cited reference.

The AND-OR gates, such as units 87*a*, may be of the type disclosed at page II–11 of the above reference and identified as a "switch and mix" circuit.

Gated amplifiers, such as unit 56, may be of the type disclosed in Waveforms, Radiation Laboratory Series, Volume 19, McGraw-Hill (1949), in Chapter 10 beginning at page 364. A simple gate is disclosed in FIG. 10.1 at page 366. A gated pentode unit is shown in FIG. 10.16 at page 379.

Bistable multivibrators, such as units 75*a*–75*d*, may be of the type disclosed in Basic Theory and Application of Transistors, TM 11–690 (Department of the Army Technical Manual, 1959) at page 203. Monostable multivibrators, such as the unit 90, may be of the type disclosed in the latter reference at pages 199 and 200.

The counter 83 may be of types widely used and well known. By way of example, the counters may be of the type generally disclosed in Waveforms, Radiation Laboratory Series, Volume 19, McGraw-Hill (1949), in Chapter 17 beginning at page 602 with a suitable "scale-of-10" counter being shown in FIG. 17.8, page 611.

The detector 34*b* may be a scintillation crystal with the photocell 34*c* of the type normally employed in scintillometers. The counter 35*a* is an integrating counter which will provide a scalar output proportional to the number of pulses registered by the counter during the interval the switch 35 is closed. Counters of this type are described in U.S. Pat. No. 2,949,973 to Broding et al.

The motors 46–49 have been indicated as being of the type which will drive switches 41–44, respectively, in a random manner. The motors 46–49 may each be the actuating coils or motor structures in multiterminal stepping relays. In this case each would include a means energized from source 50 for generating a randomly occurring energizing pulse. Generation of random pulses is disclosed in Threshold Signals, MIT Radiation Laboratory Series, Volume 24, McGraw-Hill (1950). A source for operation in accordance with the present invention may be a temperature limited diode of the type discussed at page 79 of this work wherein the shot effect is utilized in random pulse generation. Since the switches 41–44 are mechanical devices having inherent minimum operating periods, there is a limiting or maximum frequency at which they might be actuated. The random pulse sources employing temperature limited diodes would be biased such that only pulses of amplitude exceeding a minimum value would be applied to the motors 46–49. The bias would be selected such that the average interval between random pulses above the bias level would be substantially in excess of the period of each stepping relay.

Thus, from the foregoing description it will be seen that there is provided a method of optimizing a system having a characteristic operating function which includes selection from a plurality of function models a fractional portion thereof as a test group. Thereafter, the single member of the test group having characteristics most nearly corresponding with a preselected characteristic is optimized. The system is then sampled at a point in the region of the point corresponding with the optimum of the member of the test group. The system is cycled over a plurality of routines of the foregoing character to arrive ultimately at the optimum of the system being optimized.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of optimizing a system having a characteristic operating function which comprises in an automatic computer the steps of:

sampling said operating function at at least one operating point, selecting from a plurality of function generators a fractional portion thereof as a test set, scanning the members of said set individually with the value of said operating function at said at least one operating point, optimizing the output of the member of said set having a characteristic most nearly corresponding with the characteristic of said function at said at least one operating point, and sampling said operating function at the operating point corresponding with the optimized output.

2. The method of optimizing a system which comprises in an automatic computer the steps of:

sampling said system at a first operating point, selecting from a multiplicity of function generators a fractional portion thereof as a test set, scanning the members of said set with the data of said first operating point in the region corresponding with said first operating point in said system to select one output from said set, optimizing said one output, and sampling said system at an operating point in the region of the point corresponding with the optimum of said one output.

3. The method of optimizing a system which comprises in an automatic computer the steps of:

sampling said system at a first operating point, selecting at random from a multiplicity of function generators a fractional portion thereof as a test set, scanning said set in the region corresponding with said first operating point in said system to select one output function from said set, optimizing said one output function, and sampling said system at another operating point in the region of the point corresponding with the optimum of said one output function.

4. The method of optimizing a reaction system which comprises in an automatic computer the steps of:

sampling said system at a first operating point, selecting at least partially at random one function generator from many function generators, establishing a condition in said one function generator corresponding with said first operating point in said system, optimizing the output of said one function generator, adjusting said system for operation at a second operating point corresponding with the optimized output, selecting at least partially at random a second function generator from said many function generators, establishing in said second function generator conditions representative of said first and second operating points in said system, optimizing the output of said second function generator, and similarly selecting successive function generators until the difference between the optimized output and conditions representative of a corresponding operating point in said system are minimal.

5. Means for optimizing a system comprising:

means for sampling said system at an operating point, means for selecting at random from a multiplicity of function generators a fractional portion thereof as a test set, means for scanning said set in the region corresponding with said first operating point in said system to select one output function from said set, means for optimizing said one output function, and means responsive to the optimized output function for causing said sampling means to sample said system at an operating point in the region of the point corresponding with the optimum of said one output function.

* * * * *